United States Patent
Bigeard

(10) Patent No.: US 11,220,350 B2
(45) Date of Patent: Jan. 11, 2022

(54) CONTROL SYSTEM FOR CONTROLLING A SHUT-OFF VALVE OF AN AIRCRAFT, AN AIRCRAFT EQUIPPED WITH SUCH A CONTROL SYSTEM, AND AN ASSOCIATED CONTROL METHOD

(71) Applicant: AIRBUS HELICOPTERS, Marignane (FR)

(72) Inventor: Antoine Bigeard, Velaux (FR)

(73) Assignee: AIRBUS HELICOPTERS

( * ) Notice: Subject to any disclaimer, the term of this patent is extended or adjusted under 35 U.S.C. 154(b) by 0 days.

(21) Appl. No.: 17/094,928

(22) Filed: Nov. 11, 2020

(65) Prior Publication Data
US 2021/0147097 A1    May 20, 2021

(30) Foreign Application Priority Data
Nov. 14, 2019 (FR) ....................... 1912718

(51) Int. Cl.
*B64D 45/00* (2006.01)
*B64D 31/04* (2006.01)
(Continued)

(52) U.S. Cl.
CPC ............. *B64D 45/00* (2013.01); *B64D 31/04* (2013.01); *B64D 31/06* (2013.01); *B64D 33/02* (2013.01);
(Continued)

(58) Field of Classification Search
CPC ........ B64D 45/00; B64D 31/04; B64D 31/06; B64D 33/02; B64D 2033/0246;
(Continued)

(56) References Cited

U.S. PATENT DOCUMENTS

| | | | |
|---|---|---|---|
| 11,117,677 B2 * | 9/2021 | Boyce | ........................ F02C 7/05 |
| 2008/0190177 A1 | 8/2008 | Wiggins et al. | |

(Continued)

FOREIGN PATENT DOCUMENTS

| | | |
|---|---|---|
| EP | 1143232 A1 | 10/2001 |
| EP | 2957503 A1 | 12/2015 |
| KR | 20170121437 A | 11/2017 |

OTHER PUBLICATIONS

Donaldson Filtration Solutions: "Bell 407/GX IBF Inlet Barrier Filter (IBF) System". Apr. 15, 2015. http://donaldsonaerospace-defense.com/library/files/documents/pdfs/2015-BellLight-Bell407-013015.pdf.

(Continued)

*Primary Examiner* — Syed O Hasan
(74) *Attorney, Agent, or Firm* — Brooks Kushman P.C.

(57) ABSTRACT

A control system for controlling a shut-off valve of an aircraft. The shut-off valve is configured to open a bypass circuit that is initially closed. This circuit makes it possible to feed air to an aircraft engine without going via an air filter associated with an air intake. The control system comprises: a manual control member for controlling the shut-off valve, this member being actuatable manually so as to cause the bypass circuit to open; and a computer configured to compute a current value of a level of clogging TC of an air filter. The control system further comprises a comparator for comparing the current value of the level of clogging TC with a first threshold value TC1 and with a second threshold value TC2, and an alerter for generating a first sensory signal and a second sensory signal.

12 Claims, 3 Drawing Sheets

(51) Int. Cl.
*B64D 31/06* (2006.01)
*B64D 33/02* (2006.01)
*F02M 35/024* (2006.01)
*F02M 35/08* (2006.01)
*F02M 35/09* (2006.01)
*F02M 35/10* (2006.01)
*F02M 35/16* (2006.01)
*G01N 15/08* (2006.01)

(52) U.S. Cl.
CPC ........ *F02M 35/024* (2013.01); *F02M 35/082* (2013.01); *F02M 35/09* (2013.01); *F02M 35/1038* (2013.01); *F02M 35/10255* (2013.01); *F02M 35/16* (2013.01); *B64D 2033/0246* (2013.01); *B64D 2045/0085* (2013.01); *G01N 15/0826* (2013.01); *G01N 2015/084* (2013.01)

(58) Field of Classification Search
CPC ......... B64D 2045/0085; F02M 35/024; F02M 35/082; F02M 35/09; F02M 35/10255; F02M 35/1038; F02M 35/16; G01F 9/00; B64C 27/12; G01N 11/10; G01N 11/02
See application file for complete search history.

(56) References Cited

U.S. PATENT DOCUMENTS

| | | | |
|---|---|---|---|
| 2009/0007528 | A1 | 1/2009 | Wilson |
| 2013/0092798 | A1* | 4/2013 | Boyce ................ B01D 46/0087 244/53 B |
| 2015/0344141 | A1 | 12/2015 | Brand |
| 2016/0347479 | A1* | 12/2016 | O'Neil ...................... B64F 5/60 |
| 2017/0067769 | A1* | 3/2017 | Steinert ................. G01N 11/02 |
| 2017/0067814 | A1 | 3/2017 | Steinert |

OTHER PUBLICATIONS

French Search Report for French Application No. FR1912718, Completed by the French Patent Office, dated Jul. 7, 2020, 19 pages.

* cited by examiner

CONTROL SYSTEM FOR CONTROLLING A SHUT-OFF VALVE OF AN AIRCRAFT, AN AIRCRAFT EQUIPPED WITH SUCH A CONTROL SYSTEM, AND AN ASSOCIATED CONTROL METHOD

CROSS-REFERENCE TO RELATED APPLICATIONS

This application claims priority to French patent application No. FR 19 12718 filed on Nov. 14, 2019, the disclosure of which is incorporated in its entirety by reference herein.

BACKGROUND OF THE INVENTION

(1) Field of the Invention

The present invention relates to the technical field of aircraft, and more particularly to control systems for controlling a shut-off valve of an aircraft. Such a shut-off valve makes it possible to open a bypass circuit for feeding air to at least one engine of the aircraft. In a normal operating mode, the air feeding such an engine of the aircraft enters an air intake and goes through an air filter positioned in said air intake.

(2) Description of Related Art

Alternatively to feeding an engine, the air going through the air filter may make it possible to feed any other pieces of equipment of the aircraft, such as, in particular, a piece of equipment providing air conditioning of the air inside the aircraft. However, in order to simplify the description, the air going via the bypass circuit is considered below as being for feeding the engine(s) of the aircraft.

Similarly, in the remainder of this application, the term "pilot of the aircraft" is used for simplification reasons, but it may optionally designate any member of the crew of the aircraft who is authorized to fly the aircraft, such as, for example, a copilot. The term "pilot" may also be used to designate any person who is not on board the aircraft and who participates remotely and fully or partially in flying the aircraft.

In a general manner, it is known that a level of clogging of an air filter can be indicated to a pilot of the aircraft. Furthermore, the level of clogging of an air filter has penalizing effects on the operation of the system fed via the air intake. When the air intake is for an engine, clogging of the air filter gives rise to head loss that reduces the power of the engine. Such head loss can then, in particular, limit the flight performance of the aircraft.

In particular, it is known from Documents US 2008/190177, US 2009/007528, US 2017/067769, and US 2017/067814 that assessment systems can be implemented that include an information device such as a screen making it possible to indicate to an aircraft pilot information about the level of clogging of an air filter positioned in an air intake. Such assessment systems also include a measurement member for measuring a differential pressure $\Delta pt$ between a reference pressure and a pressure measured downstream from the air filter in the air intake. An on-board computer is configured to generate the required information on the basis of the measurement of the differential pressure $\Delta pt$, the measurement member and the information device being connected to the on-board computer.

Such an assessment system also determines an operating power of the engine of the aircraft on the basis of its current speed of rotation. As a function of said operating power, the assessment system can then modify the value of the differential pressure threshold corresponding to an air filter that is dirty.

Thus, such an assessment system makes it possible only to quantify a current differential pressure difference relative to a variable threshold value corresponding to a dirty air filter, for a given power level.

Document US 2015/344141 describes a particular air filter equipped with a check valve.

Finally, Document US 2016/0347479 describes a system making it possible to check the health of an engine equipped with an air filter and with a bypass circuit. The checking can be performed when the bypass circuit is open or when the bypass circuit is closed. However, such a system does not make is possible to know the overall performance of the full installation, including the air filter, and is thus not representative of a level of clogging of the air filter.

Such a system can then minimize the real level of power of the engine, and can result in maintenance operations that are premature. That system can also impose performance that is limited, and thus, for example, allow only a limited number of people aboard an aircraft.

Furthermore, with those various assessment systems, when the level of clogging reaches a predefined threshold, the pilot is informed by means of an alerter such as a screen or a dial or gauge, and the pilot then opens the shut-off valve that initially shuts off the bypass circuit that bypasses the air intake. The pilot can then continue the mission. However, defining the threshold value is problematic and constitutes a compromise between the allowable flight performance of the aircraft and the operation time for finishing a mission in an environment that is possibly polluted and in which the pollution level is not known in advance.

BRIEF SUMMARY OF THE INVENTION

The object of the present invention is thus to propose a control system that enables the above-mentioned limitations to be overcome.

In accordance with the invention, such a control system enables the pilot to choose to leave the shut-off valve closed or to open it depending on the pilot's needs.

This possibility of leaving the shut-off valve closed or of opening it thus, in particular, enables the pilot, in a first situation, to favor carrying a heavy payload on the aircraft if the environment through which the aircraft is flying or is going to have to fly is mildly polluted. In such a situation, the pilot opens the shut-off valve and thus opens the bypass circuit so that the air feeds the engine (s) without going via the air filter, which is completely or partially clogged.

In a second situation, the pilot might choose to leave the shut-off valve closed, at least temporarily, and thus to favor protecting the engine(s) if the pilot deems that the outside environment is highly polluted. This second choice is then made to the detriment of the flight performance allowable by the engine(s).

Thus, the invention provides a control system for controlling a shut-off valve of an aircraft, the shut-off valve being configured to open a bypass circuit that is initially closed, the bypass circuit making it possible to feed air to at least one engine of the aircraft without going via at least one air filter equipping an air intake, the control system comprising:

a manual control member for controlling the shut-off valve, the manual control member being actuatable manually by a pilot of the aircraft so as to cause the bypass circuit to open;

a first measurement member for taking a differential pressure measurement Δpt between a reference pressure and a pressure measured downstream from the air filter(s) in the air intake;

a second measurement member making it possible to determine a value for the operating power P of the engine(s); and at least one computer configured to compute a current value of a level of clogging TC of the air filter(s), the level of clogging TC being a function of the differential pressure measurement Δpt, of a first predetermined limit Δpc and of a second predetermined limit Δpd to the value of the operating power P of the engine(s), the first limit Δpc being a predetermined lower limit equal to a differential pressure value for a clean air filter at the value of the operating power P of the engine(s), the second limit Δpd being a predetermined upper limit equal to a differential pressure value for a dirty air filter at the value of the operating power P of the engine(s), and the first measurement member and the second measurement member being respectively connected to the computer (s).

In accordance with the invention, the control system is remarkable in that it further comprises:

at least one comparator for comparing the current value of the level of clogging TC with a first threshold value and with a second threshold value, the second threshold value being greater than the first threshold value; and at least one alerter for generating a first sensory signal that is generated when the current value of the level of clogging TC reaches the first threshold value and a second sensory signal that is generated when the current value of the level of clogging TC reaches the second threshold value, the first sensory signal being distinct from the second sensory signal.

In practice, the level clogging TC may be equal to:

$$TC = \frac{\Delta pt - \Delta pc}{\Delta pd - \Delta pc}$$

Advantageously, the first limit Δpc and the second limit Δpd may vary as a function of the operating power P of the engine(s).

In other words, the first limit Δpc and the second limit Δpd may be associated with numerical functions, the values of the first limit Δpc and of the second limit Δpd varying with the operating power P of the engine(s).

Furthermore, the expression "sensory signal" is used to mean a visual signal, e.g. a light signal, a sound signal, or a vibration signal generated by the alerter. Such an alerter is thus not limited to displaying a light signal but rather it may, for example, also include a vibrator, a buzzer, a loudspeaker, or a mechanical member suitable for generating vibrations, in particular in the seat of the aircraft or in a control member of the aircraft.

Furthermore, the comparator(s) make(s) it possible to transmit to the alerter(s) an alert instruction with the aim of determining a positioning of the current value of the level of clogging TC relative to the first threshold value and to the second threshold value.

These first and second threshold values may, for example, be predetermined values in a memory, or indeed be computed and adapted, while the aircraft is being used, by a computer dedicated to such computation, or by the computers configured to compute the current value of the level of clogging TC.

For the pilot, choosing whether or not to actuate the control member is then possible from the moment the first sensory signal is generated to the moment the second sensory signal is generated. The manual control member may be actuated by the pilot when the first sensory signal is generated. However, once the second sensory signal is generated, the pilot no longer has any possible choice, and must then actuate the control member in order to open the shut-off valve, thereby opening the bypass circuit.

Furthermore, such control causing the shut-off valve to open may be achieved via an actuator of the pneumatically, hydraulically, or electrically controlled actuator type, or by releasing a locking member of the shut-off valve that enables the shut-off valve to be locked in the closed position initially.

Advantageously, the control system may further comprise a processing unit for automatically generating a control signal for controlling a safety actuator making it possible to open the shut-off valve so as to cause the bypass circuit to open automatically, the control signal being generated when the current value of the level of clogging TC is greater than or equal to a third threshold value, the third threshold value being greater than the second threshold value. This third threshold value is defined to guarantee the operability of the engine and thus the safety of the flight.

For safety reasons, such a safety actuator then prevents the pilot from using air going through the air filter when the air filter is too clogged, corresponding to a current value of the level of clogging TC equal to the third threshold value.

Such a processing unit is then connected in wired or wireless manner to the computer(s) that is/are configured to compute a current value of a level of clogging TC, to the comparator(s), and to the safety actuator. Such a safety actuator may also be formed by a pneumatically, hydraulically, or electrically controlled actuator, and be distinct from or combined with the actuator controlled by the manual control member.

In a first embodiment of the invention, the alerter(s) may comprise a single alerter for generating the first sensory signal and the second sensory signal.

In this way, the first sensory signal and the second sensory signal may be generated by the single alerter at the same place, e.g. on an instrument panel of a cockpit of the aircraft.

In which case, the single alerter may be chosen from among the group comprising screens, light sources, holographic devices, dials with needles, and displays worn by a pilot, such as spectacles, goggles, ophthalmological lenses, and a helmet visor.

In a second embodiment of the invention, the alerter(s) may comprise a first alerter for generating the first sensory signal and a second alerter for generating the second sensory signal, the second alerter being distinct from the first alerter.

Thus, the first and second alerters may be disjoint from each other. The first alerter may, for example, be positioned on the instrument panel of a cockpit while the second alerter may be a display worn by the pilot, and vice versa.

As above, the first and second alerters may be chosen from among the group comprising screens, light sources, holographic devices, dials with needles, and displays worn by a pilot, such as spectacles, goggles, ophthalmological lenses and a helmet visor.

The invention also provides an aircraft having at least one engine for driving at least one lift rotor in rotation, the aircraft having an air intake equipped with at least one air filter for feeding air to the engine(s), the aircraft also having a bypass circuit for feeding air to the engine(s) without going via the air filter(s), and a shut-off valve configured to open the bypass circuit that is initially closed.

In accordance with the invention, such an aircraft is remarkable in that it includes a control system for controlling the shut-off valve as described above.

Therefore, such an aircraft enables the pilot to have the possibility of choosing whether or not to actuate the control member for controlling the closure valve depending on the mission that the pilot is flying, and on the level of pollution through which the mission is to be flown. This possibility is given to the pilot as from the moment at which the first sensory signal is generated and until the second sensory signal is generated.

In practice, the aircraft may include at least one control computer that generates a control instruction for controlling an actuator so as to control the bypass valve(s).

In addition, when the bypass circuit is closed and when the current value of the level of clogging TC is less than the first threshold, the aircraft may be flown with a maximum level of available performance equal to a first level of available performance, the first level of available performance thus being associated with the first threshold value of the level of clogging TC.

In other words, this first level of available performance is associated with an air filter that is clean or that is clogged to a small extent with dust or dirt. The aircraft may be used normally and may carry a maximum payload.

However, when the bypass circuit is open, the maximum level of available performance of the aircraft is equal to a second level of available performance, the second level of available performance being greater than the first level of available performance regardless of the level of clogging of the filter.

In which case, when the bypass circuit is open, the maximum level of performance is chosen, in such a manner as to be always better than the level of performance associated with the first threshold value. Such an arrangement makes it possible to have only one maximum level of performance and therefore not to overload a flight manual of the aircraft unnecessarily.

In another aspect of the invention, when the bypass circuit is closed and when the current value of the level of clogging TC lies in the range extending from the first threshold value to the second threshold value, the maximum level of available performance of the aircraft is equal to a third level of available performance, the third level of available performance being associated with the second threshold value and being less than the first level of available performance.

Thus, the flight can be continued but the pilot uses the aircraft with a level of available performance that is limited relative to the first level of performance, i.e. before the first threshold value of the level of clogging TC is exceeded.

The present invention also provides a control method for controlling a shut-off valve of an aircraft, the shut-off valve being configured to open a bypass circuit that is initially closed, the bypass circuit making it possible to feed air to at least one engine of the aircraft without going via at least one air filter equipping an air intake, the control method comprising:

a first measurement step for taking a differential pressure measurement $\Delta pt$ between a reference pressure and a pressure measured downstream from the air filter(s) in the air intake;

a second measurement step for determining a value for the operating power P of the engine(s); and at least one computation step for computing a current value of a level of clogging TC of the air filter(s), the level of clogging TC being a function of the differential pressure measurement $\Delta pt$, and of a first predetermined limit $\Delta pc$ and of a second predetermined limit $\Delta pd$ to the value of the operating power P of the engine(s), the first limit $\Delta pc$ being a predetermined lower limit equal to a differential pressure value for a clean air filter at the value of the operating power P of the engine(s), and the second limit $\Delta pd$ being a predetermined upper limit equal to a differential pressure value for a dirty air filter at the value of the operating power P of the engine(s).

In accordance with the invention, such a control method is remarkable in that it further comprises:

at least one comparison step for comparing the current value of the level of clogging TC with a first threshold value and with a second threshold value, the second threshold value being greater than the first threshold value; and an alert step generating a first sensory signal when the current value of the level of clogging TC reaches the first threshold value and a second sensory signal when the current value of the level of clogging TC reaches the second threshold value.

As mentioned above, the computation and comparison steps may be performed by the same computer, or by the same processor, or indeed by a plurality of pieces of equipment. Once the computation and comparison steps have been performed, the control method then makes it possible to alert the pilot of the aircraft with the first sensory signal and with the second sensory signal as a function of the current value of the level of clogging TC.

Advantageously, the method may further comprise an actuation step during which a pilot of said aircraft actuates a manual control member for manually controlling the shut-off valve, the manual control member making it possible to cause the bypass circuit to open, provision being made so that the actuation step may be implemented when the first sensory signal is generated, and the actuation step must be implemented when the second sensory signal is generated.

Such opening of the bypass circuit takes place by controlling an actuator such as, for example, a pneumatically, hydraulically, or electrically controlled actuator. This actuation step for actuating the control member is implemented at the initiative of the pilot who deems it useful or necessary to open the bypass circuit as a function of the level of pollution of the outside environment and of the flight performance needs of the mission to be flown.

In practice, the method may further comprise an automatic control step for automatically controlling the shut-off valve so as to cause the bypass circuit to open automatically when the current value of the level of clogging is greater than or equal to a third threshold value, the third threshold value being greater than the second threshold value.

In addition, this automatic control step makes it possible, in the event, for example, that the pilot forgets to open the bypass circuit manually, to cause a safety actuator to open the bypass circuit. Such a safety actuator may be a dedicated actuator, but it may also consist in an actuator making it possible to cause the shut-off valve to be opened manually.

In addition, such a third threshold value is defined to guarantee operability of the engine of the aircraft.

In another aspect of the invention, it is possible to generate a control instruction for controlling the bypass valve(s).

In addition, when the bypass circuit is closed and when the current value of the level of clogging TC is less than the first threshold value, the maximum level of available performance of the aircraft is then equal to a first level of available performance, the first level of available performance being associated with the first threshold value.

Thus, the control method makes it possible to adapt the level of operating performance of the engine(s) of the aircraft. Therefore, the method may further comprise a step for using the engine (s) with a maximum level of available power associated with the first threshold value.

Furthermore, when the bypass circuit is open, the maximum level of available performance of the aircraft is then equal to a second level of available performance, the second level of available performance being greater than the first level of available performance.

In which case, the control method makes it possible to improve the level of operating performance of the engine(s) of the aircraft when the shut-off valve is open.

In addition, when the bypass circuit is closed and when the current value of the level of clogging TC lies in the range extending from the first threshold value to the second threshold value, the maximum level of available performance of the aircraft may be equal to a third level of available performance, the third level of available performance being associated with the second threshold value and being less than the first level of available performance.

In this way, the control method makes it possible to preserve the engine(s) by limiting its/their maximum level of available performance. Indeed, with a clogged or partially clogged air filter, head loss takes place and can reduce the power of the engine(s). In order to mitigate this reduction in power, the control method thus increases the maximum level of available performance.

In a first implementation of the invention, the alert step may generate the first sensory signal and the second sensory signal on a single alerter.

Such an arrangement of the alerter thus makes it possible to simplify the architecture, e.g. the electronic architecture, that makes it possible to produce the alert with the first and second sensory signals. Such a single alerter may, in particular, be in the form of a screen or of a dial with a needle. A bar graph representing the current value of a level of clogging TC may be displayed on the same screen. In which case, the first sensory signal may consist in a first display color of the bar graph, said first color being, for example, white, and the second sensory signal may consist in a second display color of the bar graph, said second color being, for example, yellow.

In a second implementation of the invention, the alert step may generate a first sensory signal with a first alerter and a second sensory signal with a second alerter that is distinct from the first alerter.

In which case, the first alerter and the second alerter are disjoint from each other and may, for example, either be arranged in two distinct zones of the same instrument panel, or one be arranged on an instrument panel and the other be worn by a pilot of the aircraft, it being possible for such a worn display to comprise a helmet visor, spectacles or goggles, or any analogous transparent surface.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures are given the same references in each of them.

As mentioned above, the invention relates to a control system for controlling a shut-off valve of an aircraft.

Figure 1:
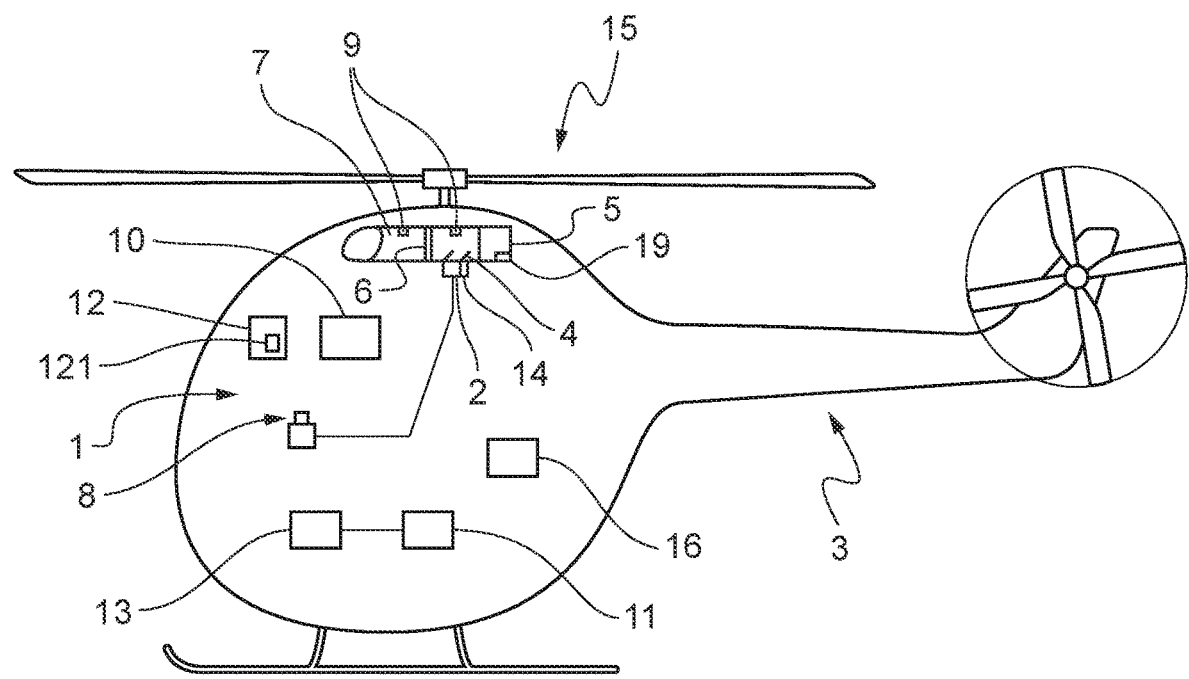
FIG. 1 is a side view diagrammatically showing an aircraft of the invention.

As shown in FIG. 1, such a shut-off valve 2 is configured to open, if necessary, a bypass circuit 4 that is initially closed, which bypass circuit 4 makes it possible to feed air to at least one engine 5 of an aircraft 3 without going via at least one air filter 6 equipping an air intake 7.

In addition, a control system 1 for controlling the shut-off valve 2 then includes a manual control member 8 for manually controlling the shut-off valve 2. This manual control member 8 is thus actuatable manually by a pilot of the aircraft 3 to cause the bypass circuit 4 to open at the request of the pilot.

The control system 1 also includes a first measurement member 9 for taking a differential pressure measurement $\Delta pt$ between a reference pressure and a pressure measured downstream from the air filter(s) 6 in the air intake 7.

A second measurement member 19 makes it possible to determine a value for the operating power P of the engine(s) 5.

Furthermore, at least one computer 10 is configured to compute a current value for a level of clogging TC of the air filters 6 under the dependence of the differential pressure measurement $\Delta pt$ and of the value of the operating power P of the engine (s) 5. Thus, the first measurement member 9 and the second measurement member 19 are connected respectively to the computer(s) 10 in wired or wireless manner.

In addition, the control system 1 also includes at least one comparator 11 making it possible to compare the current value of the level of clogging TC with a first threshold value $TC_1$ and with a second threshold value $TC_2$ said second threshold value $TC_2$ being greater than the first threshold value $TC_1$.

In a first embodiment of the invention that is shown in FIG. 1, this control system 1 includes an alerter 12 comprising a single alerter 121 making it possible to generate at least two distinct sensory signals.

Figure 3:
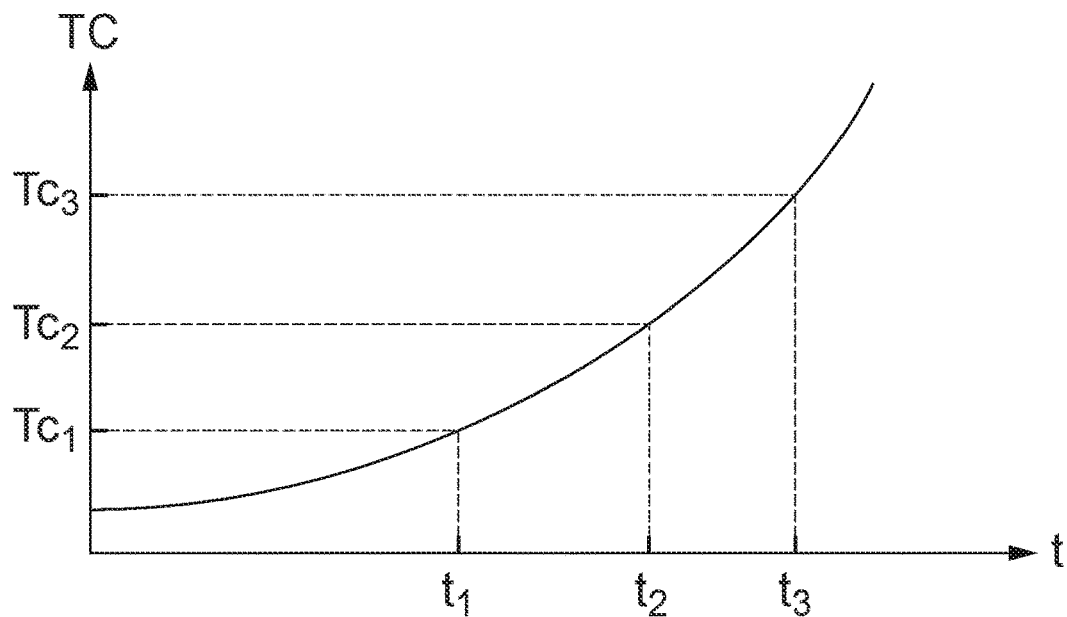
FIG. 3 shows a curve representing the level of clogging of an air filter as a function of time.

As shown in FIG. 3, these at least two distinct sensory signals comprise a first sensory signal that is generated as from the instant t1 when the current value of the level of clogging TC reaches the first threshold value $TC_1$ and a second sensory signal that is generated as from the instant t2 when the current value of the level of clogging TC reaches the second threshold value $TC_2$.

Advantageously the single alerter 121 may be chosen from among the group comprising screens, light sources, holographic devices, dials with needles, and displays worn by a pilot, such as spectacles, goggles, ophthalmological lenses and a helmet visor.

Figure 2:
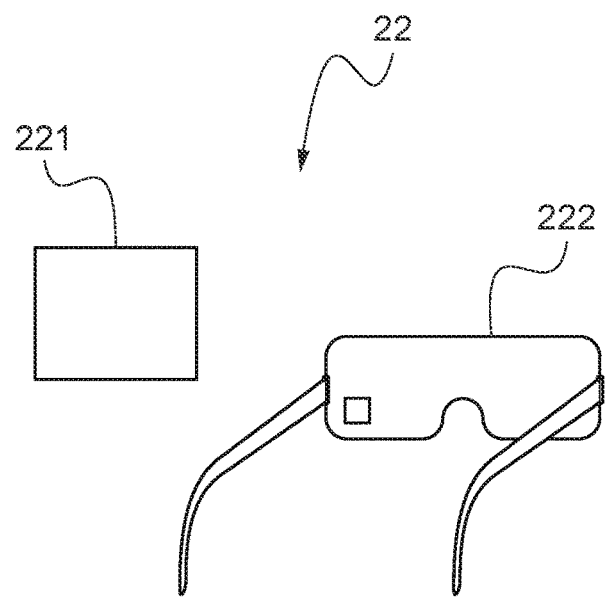
FIG. 2 is a view showing two alerters in another aspect of the invention.

In a second embodiment of the invention that is shown in FIG. 2, the control system 1 may alternatively include at least one alerter 22 comprising a first alerter 221 making it possible to generate a first sensory signal and a second alerter 222 making it possible to generate a second sensory signal distinct from the first sensory signal.

As shown in this second embodiment, the first alerter 221 may be formed by a screen associated with an instrument panel of a cockpit of the aircraft 3, and the second alerter 222 may be formed by a display worn by the pilot, such as spectacles, goggles, ophthalmological lenses, and a helmet visor.

Furthermore, the manual control member 8 may then be actuated by the pilot when the first sensory signal is generated, but said manual control member 8 must be actuated by the pilot when the second sensory signal is generated.

In addition, the control system 1 may also include a processing unit 13 suitable for automatically generating a control signal for controlling a safety actuator 14 making it possible to actuate the shut-off valve 2 so as to cause the bypass circuit 4 to open automatically. At instant t3 shown in FIG. 3, this control signal is then generated automatically by the processing unit 13 when the current value of the level of clogging TC is greater than or equal to a third threshold value $TC_3$, said third threshold value $TC_3$ being greater than the second threshold value $TC_2$.

In addition, the computer(s) 10, the comparator(s) 11, and the processing unit 13 may be members that are distinct from one another, or, alternatively be combined with one another. Furthermore, the computer(s) 10 or the comparator(s) 11 and the processing unit 13 may, for example, comprise at least one processor and at least one memory, at least one integrated circuit, at least one programmable system, and/or at least one logic circuit, these examples not limiting the scope given to the expressions "computer", "comparator" and "processing unit". The term processor may be used equally well to designate a central processing unit (CPU), a graphics processing unit (GPU), a digital signal processor (DSP), a microcontroller, etc.

Furthermore, the aircraft 3 may include a control computer 16 making it possible to generate a control instruction for controlling the shut-off valve(s) 2.

In addition, before instant t1 of FIG. 3, when the bypass circuit 4 is closed and when the current value of the level of clogging TC is less than the first threshold $TC_1$, the aircraft may be flown with a maximum level of available performance of the engine(s) 5 that may be equal to a first level of available performance, said first level of available performance being associated with the first threshold value $TC_1$.

Furthermore, at any time and if the bypass circuit 4 is open, the maximum level of available performance of the engine(s) 5 may be equal to a second level of available performance, the second level of available performance being greater than the first level of available performance.

Conversely, between instant t1 and t2, if the bypass circuit 4 is still closed, the current value of the level of clogging TC then lies in the range extending from the first threshold value $TC_1$ to the second threshold value $TC_2$. In this situation, the maximum level of available performance of the engine(s) 5 may be equal to a third level of available performance, said third level of available performance being associated with the second threshold value TC and being less than the first level of available performance.

Figure 4:
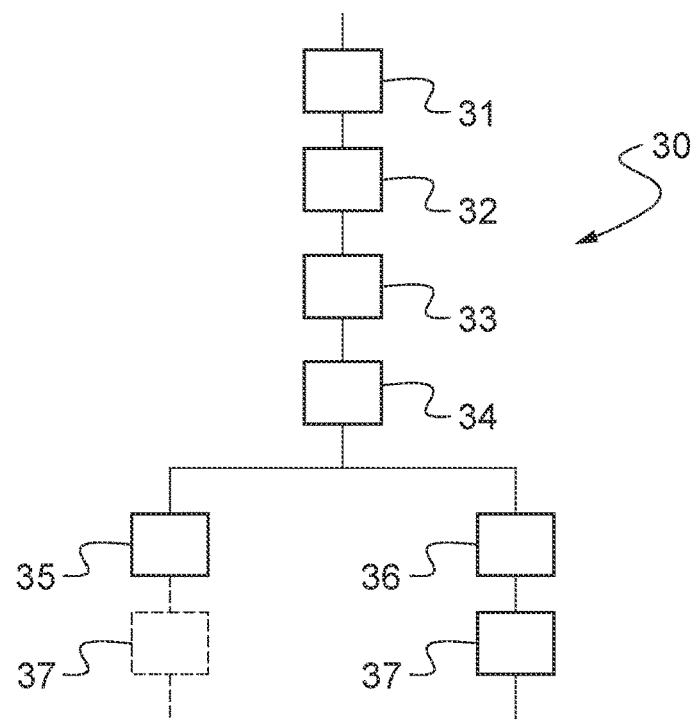
FIG. 4 is a flow chart showing a first example of a method of controlling a shut-off valve of the invention.
Figure 5:
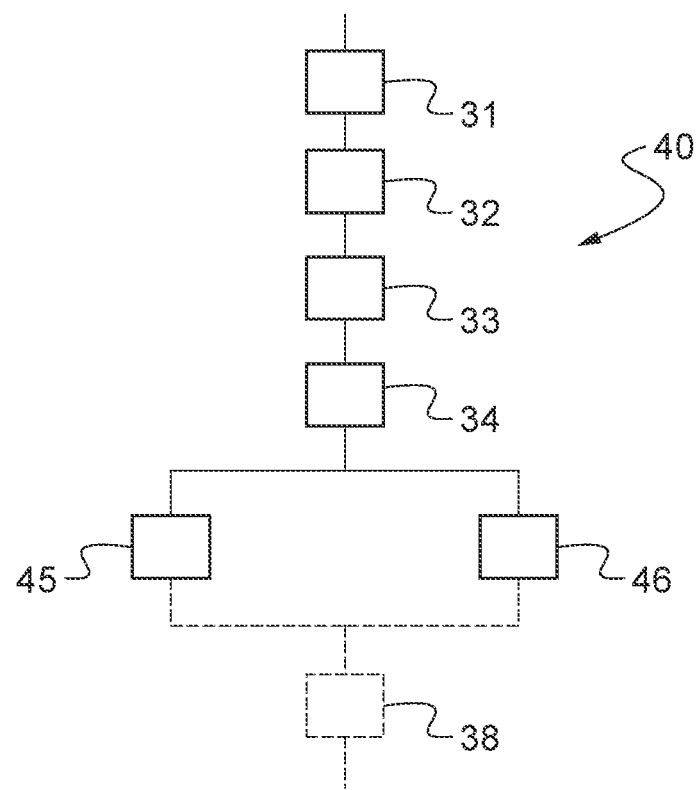
FIG. 5 is a flow chart showing a second example of a method of controlling a shut-off valve of the invention.

As shown in FIGS. 4 and 5, the invention also relates to a control method 30, 40 for controlling a shut-off valve 2 of an aircraft 3.

Such a control method 30, 40 then enables a pilot to implement steps for controlling a shut-off valve 2, such a shut-off valve 2 being configured to open a bypass circuit 4 that is initially closed, the bypass circuit 4 making it possible to feed air to at least one engine 5 of the aircraft 3 without going via an air filter 6 that equips an air intake 7.

Furthermore, the control method 30, 40 includes a first measurement step 31 for taking a differential pressure measurement $\Delta pt$ between a reference pressure and a pressure measured downstream from the air filter(s) 6 in the air intake 7.

The control method 30, 40 then includes a second measurement step 32 for determining a value of the operating power P of the engine(s) 5 and at least one computation step 33 for computing a current value of a level of clogging TC of the air filter(s) 6 under the dependence of the differential pressure measurement $\Delta pt$ and of the value of the operating power P of the engine(s) 5.

In addition, the control method 30, 40 also includes at least one comparison step 34 for comparing the current value of the level of clogging TC with a first threshold value $TC_1$ and with a second threshold value $TC_2$, the second threshold value TC being greater than the first threshold value $TC_1$.

The control method 30, 40 may then include at least two alert steps 35 & 36, 45 & 46 generating at least two distinct sensory signals, a first alert step 35, 45 generating a first sensory signal when the current value of the level of clogging TC reaches the first threshold value $TC_1$ and a second alert step 36, 46 generating a second sensory signal when the current value of the level of clogging TC reaches the second threshold value $TC_2$.

As shown in FIG. 4, the at least two alert steps 35 and 36 generate the first sensory signal and the second sensory signal on a single alerter 121 as shown in FIG. 1.

In addition, such a first variant of the control method 30 may include an actuation step 37 in which a pilot of the aircraft 3 actuates a manual control member 8 for controlling the shut-off valve 2. Said manual control member 8 then makes it possible manually to cause the bypass circuit 4 to open as from instant t1 shown in FIG. 3. This actuation step 37 may thus be implemented when the first sensory signal is generated, and the actuation step 37 must be implemented when the second sensory signal is generated.

Alternatively, and as shown in FIG. 5, the alert steps 45 and 46 may include a first alert step 45 generating a first sensory signal on a first alerter 221 as shown in FIG. 2, and a second alert step 46 generating a second sensory signal on a second alerter 222 that is distinct from the first alerter 221.

In this second variant of the control method 40 that is shown in FIG. 5, the control method 40 may, if the pilot has not actuated the manual control member 8 for manually controlling the shut-off valve 2, include an automatic control step 38 for automatically controlling the shut-off valve 2 so as to cause the bypass circuit 4 to be opened automatically.

Such an automatic control step 38 may thus be implemented automatically at, or as from, instant t3 shown in FIG. 3 by means of a safety actuator 14.

As mentioned above, instant t3 corresponds to the instant at which the current value of the level of clogging TC exceeds the third threshold value $TC_3$, this third threshold value $TC_3$ being greater than said second threshold value $TC_2$.

Naturally, the present invention may be subjected to numerous variations as to its implementation. Although several embodiments and implementations are described above, it should readily be understood that it is not conceivable to identify exhaustively all possible embodiments and implementations. It is naturally possible to envisage replacing any of the means described by equivalent means without going beyond the ambit of the present invention.

What is claimed is:

1. A control system for controlling a shut-off valve of an aircraft, the shut-off valve being configured to open a bypass circuit, the bypass circuit being initially closed, once opened the bypass circuit being suitable for feeding air to at least one engine of the aircraft without going via at least one air filter equipping an air intake, the control system comprising: a manual control member for controlling the shut-off valve, the manual control member being actuatable manually by a pilot of the aircraft so as to cause the bypass circuit to open; a first measurement member for taking a differential pressure measurement $\Delta pt$ between a reference pressure and a pressure measured downstream from the at least one air filter in the air intake; a second measurement member suitable for determining a value for the operating power P of the at least one engine; and at least one computer configured to compute a current value of a level of clogging TC of the at least one air filter, the level of clogging TC being a function of the differential pressure measurement $\Delta pt$, and of a first predetermined limit $\Delta pc$ and of a second predetermined limit $\Delta pd$ to the value of the operating power P of the at least one engine, the first limit $\Delta pc$ being a predetermined lower limit equal to a differential pressure value for a clean air filter at the value of the operating power P of the at least one engine, the second Limit $\Delta pd$ being a predetermined upper limit equal to a differential pressure value for a dirty air filter at the value of the operating power P of the at least engine, the first measurement member and the second measurement member being respectively connected to the at least one computer; wherein the control system further comprises: at least one comparator for comparing the current values of the level of clogging TC with a first threshold value TC1; and with a second threshold value TC2, the second threshold value TC2 being greater than the first threshold value TC1; and at least one alerter for generating a first sensory signal, the first sensory signal being generated when the current value of the level of clogging TC reaches the first threshold value TC1, and a second sensory signal, the second sensory signal being generated when the current value of the level of clogging TC reaches the second threshold value TC2, the first sensory signal being distinct from the second sensory signal.

2. The control system according to claim 1; wherein the control system further comprises a processing unit for automatically generating a control signal for controlling a safety actuator, the safety actuator being suitable for actuating the shut-off valve so as to cause the bypass circuit to open automatically, the control signal being generated when the current value of the level of clogging TC is greater than or equal to a third threshold value $TC_3$, the third threshold value $TC_3$ being greater than the second threshold value $TC_2$.

3. The control system according to claim 1; wherein the at least one alerter comprises a single alerter for generating the first sensory signal and the second sensory signal.

4. The control system according to claim 3; wherein the single alerter is chosen from among the group comprising screens, light sources, holographic devices, dials with needles, and displays worn by a pilot, such as spectacles, goggles, ophthalmological lenses and a helmet visor.

5. The control system according to claim 1; wherein the at least one alerter comprises a first alerter for generating the first sensory signal and a second alerter for generating the second sensory signal, the second alerter being distinct from the first alerter.

6. The control system according to claim 5; wherein the first and second alerters are chosen from among the group comprising screens, light sources, holographic devices, dials with needles, and displays worn by a pilot, such as spectacles, goggles, ophthalmological lenses and a helmet visor.

7. An aircraft having at least one engine for driving at least one lift rotor in rotation, the aircraft having an air intake equipped with the at least one air filter for feeding air to the at least one engine, the aircraft having the bypass circuit for feeding air to the at least one engine without going through the at least one air filter, and the shut-off valve configured to open the bypass circuit, the bypass circuit being initially closed; wherein the aircraft includes the control system for controlling the shut-off valve according to claim 1.

8. A control method for controlling a shut-off valve of an aircraft, the shut-off valve being configured to open a bypass circuit, the bypass circuit being initially closed, the bypass circuit being suitable for feeding air to at least one engine of the aircraft without going via at least one air filter equipping an air intake, the control method comprising:
a first measurement step for taking a differential pressure measurement $\Delta pt$ between a reference pressure and a pressure measured downstream from the at least one air filter in the air intake;
a second measurement step for determining a value for the operating power P of the at least one engine; and
at least one computation step for computing a current value of a level of clogging TC of the at least one air filter, the level of clogging TC being a function of the differential pressure measurement $\Delta pt$, and of a first predetermined limit $\Delta pc$ and of a second predetermined limit $\Delta pd$ to the value of the operating power P of the at least one engine, the first limit $\Delta pc$ being a predetermined lower limit equal to a differential pressure value for a clean air filter at the value of the operating power P of the at least one engine, and the second limit $\Delta pd$ being a predetermined upper limit equal to a differential pressure value for a dirty air filter at the value of the operating power P of the at least one engine;
wherein the control method further comprises:
at least one comparison step for comparing the current value of the level of clogging TC with a first threshold value $TC_1$ and with a second threshold value $TC_2$; the second threshold value $TC_2$ being greater than the first threshold value $TC_1$; and
an alert step generating a first sensory signal when the current value of the level of clogging TC lies in the range extending from the first threshold value $TC_1$ to the second threshold value $TC_2$ and a second sensory signal when the current value of the level of clogging TC is greater than or equal to the second threshold value $TC_2$.

9. The control method according to claim 8; wherein the method further comprises an actuation step during which a pilot of the aircraft actuates a manual control member for manually controlling the shut-off valve, the manual control member being suitable for causing the bypass circuit to open, provision being made so that the actuation step may be implemented when the first sensory signal is generated, and the actuation step must be implemented when the second sensory signal is generated.

10. The control method according to claim 8; wherein the method further comprises an automatic control step for automatically controlling the shut-off valve so as to cause the bypass circuit to open automatically when the current value of the level of clogging TC is greater than or equal to a third threshold value $TC_3$, the third threshold value $TC_3$ being greater than the second threshold value $TC_2$.

11. The control method according to claim 8;
wherein the alert step generates the first sensory signal and the second sensory signal on a single alerter.

12. The control method according to claim 8;
wherein the alert step generates a first sensory signal on a first alerter and a second sensory signal on a second alerter that is distinct from the first alerter.

* * * * *